Figure 3:
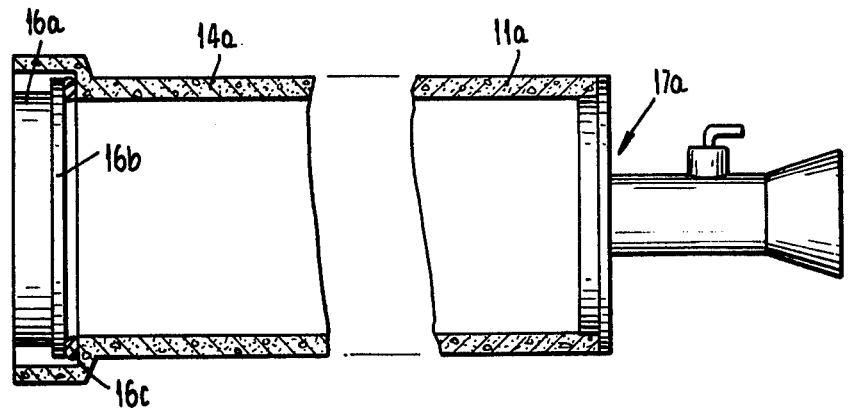

United States Patent [19]

Pentreath et al.

[11] 4,097,982

[45] Jul. 4, 1978

[54] METHOD AND APPARATUS FOR JOINING PIPES

[75] Inventors: David William Pentreath, St. Albans; Malcolm Colledge, North Altona, both of Australia

[73] Assignee: Porto & Valente Industries Pty. Limited, North Altona, Australia

[21] Appl. No.: 698,023

[22] Filed: Jun. 21, 1976

[30] Foreign Application Priority Data

Jun. 23, 1975 [AU] Australia .............................. 2094/75

[51] Int. Cl.² ...................... B23P 11/02; B23P 19/02; B23P 19/04
[52] U.S. Cl. ...................................... 29/451; 29/235; 29/237; 138/89; 138/96 R
[58] Field of Search ................. 29/450, 451, 235, 237; 138/89, 96 R

[56] References Cited

U.S. PATENT DOCUMENTS

| 2,942,625 | 6/1960 | Costanzo ........................... 138/96 R |
| 3,044,479 | 7/1962 | Meyer et al. .................. 138/96 R X |
| 3,233,315 | 2/1966 | Levake ................................... 29/237 |
| 3,713,463 | 1/1973 | Bywater, Jr. ........................... 138/89 |
| 3,952,524 | 4/1976 | Rand et al. ....................... 29/450 X |

Primary Examiner—Charlie T. Moon
Attorney, Agent, or Firm—Finnegan, Henderson, Farabow & Garrett

[57] ABSTRACT

The disclosure generally relates to a method of joining a pipe to another pipe, or to an adjacent pipe in a series of pipes in a pipeline, the joints between which incorporate sealing means, and an apparatus suitable for use in performing the method, which basically involves forming an enclosed space at least bridging the joint to be formed and evacuating the space by a vacuum pump or ejector to produce a pressure within the space lower than atmospheric pressure to allow the greater atmospheric pressure outside the pipes to axially force the pipes together against the resistance of the means forming the sealed joint between the pipes. This function may be achieved by closing the ends of the pipes to be joined remote from the position of the joint and evacuating the space within the pipes and between the end closures. Alternatively a pair of linked inflatable bags may be utilized one on one side of the joint and in one pipe and the other on the other side of the joint in the other pipe, whereby when the bags are inflated into sealing engagement with the inner surface of the respective pipes the required space for evacuation is formed.

15 Claims, 6 Drawing Figures

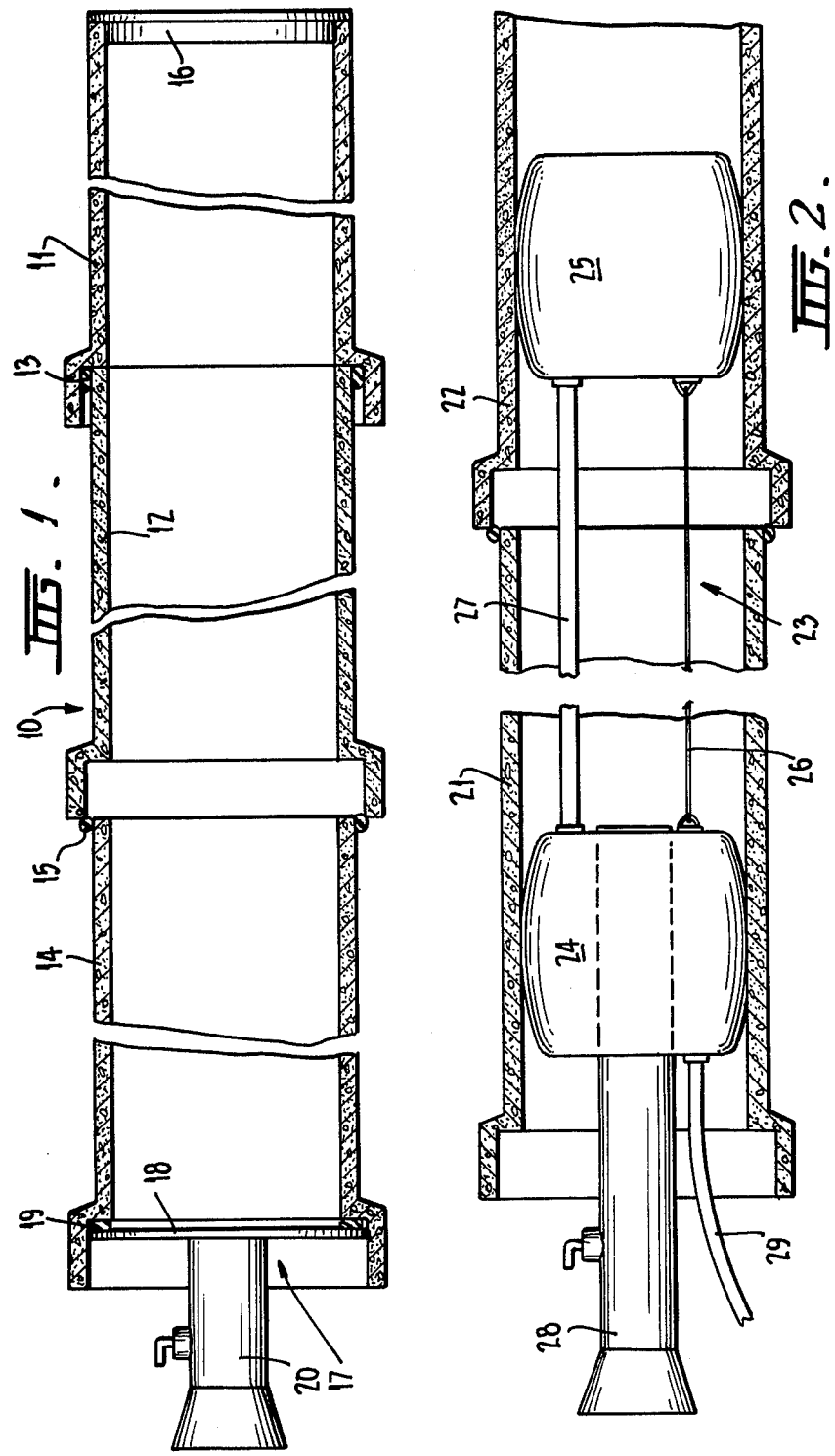

METHOD AND APPARATUS FOR JOINING PIPES

This invention relates to a method and apparatus for joining pipes and more particularly pipes incorporating an elastic sealing ring which is positioned over the spigot end of the pipe for insertion into the socket end of an adjacent pipe in a series of pipes laid end to end to form a pipe line.

The invention is applicable to joining concrete, cast iron and terra cotta pipes.

The major problem associated with jointing such pipes is the requirement to overcome the axial resistance of the elastic sealing ring on the spigot end of the pipe when axially forcing it into the socket end of an adjacent pipe. The problem is inherent in the requirement for the sealing ring to provide a sealed joint between the ends of the pipes whereby when the pipes are joined the ring will be normally radially deformed into the area between the pipes to ensure satisfactory sealing of the joint.

The types of pipes to which the invention is applicable are produced in a range of sizes depending upon the capacity for the pipe line, and with small diameter pipes the necessary axial force can be applied by hand, but with large pipe sizes mechanical aids have to be utilised to overcome the resistance of the sealing ring. For example, with concrete pipes having sizes up to 30 inches in diameter, the spigot end of the pipe to be joined to an existing pipe is positioned in the socket end of the existing pipe, a block of wood to protect the end of the pipe is positioned in the opposite socket end of the pipe to be positioned and a crowbar is utilised as a lever bearing against the block of wood to impart an axial force to the pipe thereby forcing it into the socket end of the existing pipe against the resistance of the sealing ring on the spigot end. Normally the pipe to be positioned is axially aligned with the existing pipe by looping a chain around the spigot end of the pipe and lifting the end of the pipe into an axially aligned orientation by a crowbar resting on the socket end of the existing pipe and passing beneath the chain.

For pipe diameters over 30 inches, a variety of techniques are used. "Toms" of wood may be positioned in the existing pipe and cooperate with a block and tackle to provide the necessary axial force. Alternatively, the pipe to be positioned may be lifted into axial alignment with the existing pipe by a crane, and the bucket of a backhoe or hydraulic shovel used to provide the required axial force. In situations where the pipe line is being laid in a relatively large trench the pipes may be lifted into vertical alignment by a crane or hydraulic shovel and an axial joining force applied by a traxcavator in the trench.

Similar techniques may be used for other types of piping, and with terra cotta pipes in particular it is also known to use a "Vitclay" device involving anchoring one end of a winch in the inside of the pipe to which an additional pipe is to be added, or to an existing pipe further along the length of the series of extending pipes in a pipe line, and utilising a timber cross-head in the socket end of the pipe to be positioned and axially drawing the pipe into position by a steel wire rope or chain cooperating with a winching device.

With all the conventional techniques either considerable manual effort is required to facilitate joining, or costly equipment is required which in many cases is time consuming and awkward to utilise.

It is therefore an object of the present invention to provide a method and apparatus for joining pipes which overcomes some, if not all, of the above disadvantages with known jointing techniques.

The invention therefore envisages a method of joining a pipe to another pipe, or to an adjacent pipe in a series of pipes in a pipe line, the joints between which incorporate sealing means, said method including forming a closed space inside said pipes and extending on either of said joint to be formed, and evacuating said space to a pressure below atmospheric pressure whereby the greater outside atmospheric pressure axially forces said pipes together against the resistance of the means forming the sealed joint.

According to one preferred aspect of the invention said space is provided by closing the end of an existing pipe remote from said joint, or the end of one of said pipes in a series of pipes forming an existing pipe line, and also closing the end of said pipe to be positioned, remote from said joint.

According to a first form of this preferred aspect of the invention air from said space is withdrawn through closure means for said pipe to be positioned. Alternatively in a second form of this preferred aspect of the invention air from said space is withdrawn through closure means for said existing pipe, or, in the case of a series of existing pipes forming a pipe line, in the closure means for the end of the pipe remote from the joint.

In either form of the invention, the closure means for the pipe to be positioned, is removed after axial positioning of the pipe and is placed at the end of the next pipe to be joined, and the closure means for the existing pipe, or the pipe in the series of existing pipes forming a pipe line, can be left in position whilst further pipes are added and joined in turn.

In another form of the present invention, the closure means take the form of inflatable bags which are linked together and separated by a distance at least equivalent to a distance sufficient to bridge said joint to be formed, the bags are inflated into sealing engagement with the interior of said pipes on either side of said joint, the space between said bags is evacuated to reduce the pressure therein to allow atmospheric pressure to force said joint together, the bags are subsequently deflated to allow them to disengage from the pipe walls, a further pipe is positioned and the arrangement of inflatable bags is drawn forward to bridge the new joint for subsequent jointing of said new joint.

The invention also envisages an apparatus for joining a pipe to another pipe, or to an adjacent pipe in a series of pipe in a pipe line, the joints between which incorporate sealing means, said apparatus including closure means for said pipe, and closure means for said other pipe, or one of said pipes in said series of pipes, a closed space being formed between said closure means and extending on either side of said joint, and pump means to evacuate said space to a pressure below atmospheric pressure whereby the greater atmospheric pressure outside said pipes will axially force said pipes together against the resistance of the means forming the sealed joint.

According to one preferred form of the invention the closure means for said pipe incorporates the pump means. According to a second preferred form of the invention, the closure means for said other pipe, or a series of pipes, incorporates the pump means.

The closure means are a pair of inflatable bags interconnected together and separated over a distance at least equivalent to that bridging said joint.

Preferaly said pump means is an air ejector or a vacuum pump.

Figures 4, 5:
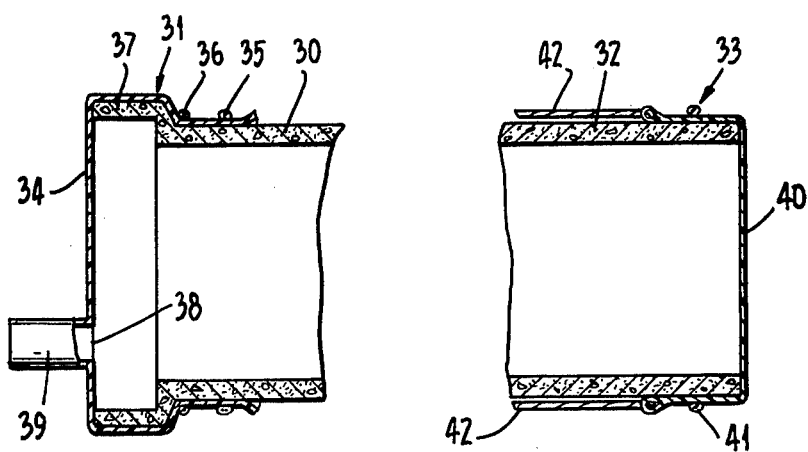
Figure 6:
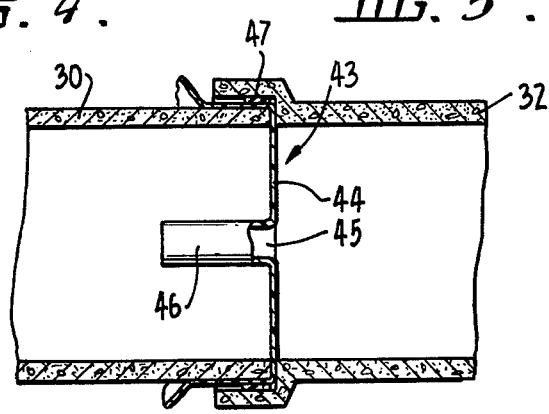

A number of preferred embodiments of the invention will now be described with reference to the accompanying drawings in which:

FIG. 1 is a side elevational view in section of a series of pipes one of which is in the process of being joined to the existing pipes and according to one preferred form of the invention, FIG. 2 is a view similar to FIG. 1 and incorporating the invention according to a second form thereof, FIG. 3 is a further view similar to FIGS. 1 and 2 and incorporating the invention according to a third form thereof and showing only details of the end portions of the pipes, FIG. 4 is a detailed view of the socket end portion of a pipe to be joined according to a fourth preferred form of the invention, FIG. 5 is a detailed view of the spigot end portion of an existing pipe in the preferred form of the invention of FIG. 4, and FIG. 6 is a detailed view of a completed joint between two pipes incorporating a modification within the preferred form of the invention according to FIGS. 4 and 5.

In FIG. 1 there is shown a plurality of pipes forming a pipe line 10 comprising a pair of pipes 11 and 12 which have been joined together and at the position of the joint between the respective spigot and socket sections includes ring 13 of rubber jammed and radially deformed between the joined ends of the pipes to effectively seal the joint.

In accordance with the present invention an additional pipe 14 is in the process of being added to the pipe line, and as shown, the sealing ring 15 has been positioned around the spigot end of the pipe 14 and is just touching the entrance to the socket of the pipe 12. The radial dimension of the annular gap between the spigot and socket sections is less than the thickness of the material of the sealing ring 15 and must be such that when the spigot of the pipe 14 is axially pushed into the socket of the pipe 12 the ring will be radially squeezed or deformed to provide tight sealing engagement against the opposed surfaces at the joint. Particularly with larger pipes the axial force necessary to overcome the resistance of the sealing ring 15 is relatively high and mechanical advantage devices of the type discussed previously are usually necessary to provide the necessary axial force.

In accordance with the present invention the necessary axial force is accomplished by closing the spigot end of the furthermost existing pipe of the pipe line (in this case pipe 11) with a closure plug 16, whilst the socket end of pipe 14 is closed by a closure plate and air ejector arrangement generally indicated as 17, which comprises a closure plate 18 and a sealing ring 19 adapted to be positioned between the closure plate 18 and the inner ledge of the socket end of the pipe 14, whilst an ejector 20 in communication with the interior of the pipe line is supported by the closure plate 18. The ejector 20 may be a conventional ejector of the type in which compressed air from a compressor is forced at high velocity through a chamber which is in communication with the port through to the interior of the pipe line, the effect of which is to draw air from the interior of the pipe line. A compressor of up to a 100 p.s.i. capacity may be utilised in combination with such an ejector. As air is withdrawn from the space in the pipe line between the closure plug 16 and the closure plate 18, the pressure within the pipe line is reduced to below atmospheric pressure and the resultant atmospheric pressure on the extreme ends of the pipe line forces pipe 14 into the socket of pipe 12 against the resistance of the sealing ring 15. It is expected that a pressure reduction of 2 – 5 p.s.i. below atmospheric in the pipe line will be sufficient to create a great enough axial joining force, although the amount of actual pressure reduction is dependent on the crosssectional area of the pipes and the inherent resistance of the sealing ring 15.

It is expected that the closure plate and ejector arrangement 17 may be held in the socket end of the pipe 14 initially by hand, until the pressure differential is great enough for atmospheric pressure to hold the arrangement in position. The greater the pressure differential the greater the sealing pressure exerted on the sealing ring 19.

After pipe 14 is joined the supply from the compressor is cut off, the pressure within the pipe line returns to close to atmospheric, the arrangement 17 is removed, a new pipe with sealing ring is positioned, the arrangement 17 reinserted in the socket end of the new pipe and the technique is repeated.

In the embodiment of FIG. 2, an arrangement utilising the concept of the present invention is illustrated but as particularly applied to longer lengths of pipe line where continued evacuation of a long length of pipe line would be impractical and time consuming.

In this arrangement only a space bridging the pipe 21 to be added and the adjacent pipe 22 is closed and evacuated. This is accomplished by a closure arrangement generally indicated as 23 comprising a pair of inflatable closure bags 24 and 25 linked together by a tie rope or cable 26 and an air hose 27 to be separated over a distance at least sufficient to bridge the joint to be made. An ejector 28 is supported on closure bag 24 and as shown is in communication with the space between the bags to allow evacuation of the space. Air is pumped into bags 24 and 25 via an air hose 29 an the air hose 27 and the bags inflated into tight sealing engagement with the inner walls of the pipes 21 and 22 and remain inflated whilst the space between the bags is evacuated and the outside atmospheric pressure forces the pipes together. After the joint is consolidated, the bags are deflated sufficiently to disengage from the pipe walls and the arrangement is drawn forwardly so that bag 24 is positioned inside the next pipe to be added, the closure bags are then inflated again and the technique is repeated.

In the embodiment of FIG. 3, the jointing technique is substantially identical to that described with reference to FIG. 1, except that the closure plate and ejection arrangement, here indicated as 17a, is fixed to the spigot end of the remotest pipe 11a in the pipeline whilst additional pipes 14a are added, and remains fixed thereto as the additional pipes are added. In this embodiment, the closure plug 16a is inserted within the socket end of the pipe 14a being added, and carries a closure plate 16b which bears against a sealing ring 16c abutting the inner ledge of the socket end of the pipe as shown. With this alternative arrangement, only the arrangement of closure plug 16a, closure plate 16b and sealing ring 16c is moved as successive pipes are added, whilst the closure plate and ejector arrangement 17a remains fixed.

FIGS. 4 and 5 show a preferred form of the present invention, and in particular, FIG. 4 illustrates an arrangement for the socket end of a pipe 30 to be joined and carrying a closure arrangement 31 whereby the requirements of the present invention can be facilitated, whilst FIG. 5 illustrates an arrangement for the spigot end of an existing pipe 32 to which the pipe 30 of FIG. 4 is to be directly joined, or which is a pipe in an existing pipeline including a plurality of pipes, and a closure arrangement 33 is provided whereby the interiors of the pipe 30 and the pipe 32 and any intervening pipes may be closed and evacuated in accordance with the concept of the present invention.

Referring to FIG. 4 of the drawings, the closure arrangement 31 for the socket end of the pipe 30 to be added and joined via a sealing ring arrangement (not shown) between its spigot end and the socket end of an adjacent existing pipe, for example, directly to the socket end of the pipe 32 of FIG. 5 or an intervening pipe in a series of existing pipes, comprises a diaphragm 34 consisting of a sheet of flexible material, for example, plastic sheeting, covering the socket end of the pipe and over beyond the flange portion 37 of the socket end where a rubber sealing ring 35 is positioned around the pipe to clamp the diaphragm in a sealing position. An additional draw-rope 36 is drawn and fastened about the pipe adjacent the flange 37 of the socket to assist in retaining the diaphragm 34 in position. The diaphragm 34 has a port 38 therethrough communicating with an outlet pipe 39 which in turn is connected to an air ejector (not shown).

Referring to FIG. 5 of the drawings, the closure arrangement 33 for the spigot end of the existing pipe 32 to which pipe pipe 30 is to be added, or which pipe forms the remotest pipe in a series of pipes, comprises a diaphragm 40 consisting of a sheet of flexible material, for example, plastic sheeting, covering the spigot end of the pipe, whilst a rubber clamping ring 41 is provided around the pipe to clamp the diaphragm in a sealing position. The free edge of the diaphragm 40 has a plurality of ropes or cables 42 threaded therethrough which in turn extend to the opposite end of the pipe 32 where they are fastened, for example, by being wound around and retained on the opposite side of the socket, to thereby effectively assist in retaining the diaphragm 40 in position on the spigot end of the pipe.

FIG. 6 represents a modification of the form of the invention of FIGS. 4 and 5, whereby in a situation where a series of pipes are to be joined end to end, provision is made to allow the effective space to be evacuated as each successive pipe is added to be kept to a minimum rather than having to evacuate a large length of pipeline each time an additional pipe is joined. According to this preferred form of the invention a dispensable intermediate closure arrangement 43 is utilised which is placed and retained in position as each pipe joint is formed, and through which air can be drawn during the evacuation at the time of forming the joint, but which can be closed after formation of the joint to form a sealed closure to define one end of the space to be evacuated as the next successive pipe is added. The closure arrangement 43 comprises a diaphragm 44 consisting of a sheet of flexible material, for example, plastic sheeting, and has an opening 45 therethrough communicating with a tubular extension 46.

In the situation where a series of pipes are to be successively joined end to end, the spigot end of the first pipe is closed by a closure arrangement such as 33 in FIG. 5 and the socket end of the first pipe to be added is closed by the closure arrangement 31 of FIG. 4. Prior to bringing the spigot end of the pipe to be added into position adjacent the socket end of the existing pipe, the intermediate closure arrangement 43 is positioned over the spigot end and clamped in position by the main sealing ring 47. The interior of the two pipes is then evacuated with the opening 45 and tubular extension 46 being open to allow evacuation of air from both pipes. After formation of the joint, the closure arrangement 33 on the spigot end of the existing pipe and the closure arrangement 31 on the socket end of the pipe added are removed, and the tubular extension 46 is clamped or tied whereby the intermediate closure arrangement 43 effectively forms a closure for the end of the newly added pipe. Prior to adding the next pipe in the series a further intermediate closure arrangement, such as 43, is positioned and clamped by the sealing ring for each joint, the closure arrangement 31 is repositioned on the socket end of the new pipe to be added and the space within the two pipes being joined is evacuated to facilitate jointing, and the procedure is repeated to allow a series of pipes to be joined end to end to form a pipe line. After each intermediate closure arrangement 43 fulfils its closing function the inner section of the diaphragm 44 within the pipe passage is removed by cutting around the periphery at the inside of the joint to form an unobstructed passage through the pipe line. Alternatively, all the inner diaphram sections within the pipe line may be so removed in turn after the pipeline is completed.

As an alternative to the ejector means utilised in the embodiments described above, a conventional vacuum pump may be utilised to evacuate the spaces formed during the application of the various embodiments of the invention described above.

We claim:

1. A method of joining a series of pipes together to form a pipeline in a fluid environment, and in which the joints between the pipes incorporate sealing means, said method including the steps of positioning closure means over the ends of first and second pipes remote from the joint to be formed between said pipes, positioning said first and second pipes in axial alignment and with a sealing means therebetween, positioning a first disposable closure means, having a closable passage therethrough, at the joint between said first and second pipes, evacuating the space within said first and second pipes to a pressure below the outside fluid pressure with the greater outside fluid pressure axially forcing the pipes together against the resistance of the sealing means at said joint, removing the closure means from the end of said second pipe remote from said joint and subsequently repositioning it on the end of a third pipe to be joined to said second pipe, closing the closable passage through said first disposal closure means to form a closure at the joint between said first and second pipes, positioning said third pipe in axial alignment with said second pipe and with a sealing means therebetween, positioning a second disposable closure means at the joint between said second and third pipes, evacuating the space within said second and third pipes to a pressure below the outside fluid pressure with the greater outside fluid pressure axially forcing said third pipe onto the end of said second pipe against the resistance of the sealing means at said joint, repeating the above steps for each successive pipe to be added, and removing an inner portion of each disposable closure means after it has performed its closure function by cutting around the inner periphery of the joint of which it forms part.

2. A method as claimed in claim 1, wherein the inner portion of each disposable closure means is removed after it has completed its closure function.

3. A method as claimed in claim 1, wherein the inner portions of the disposable closure means which have performed their closure functions are removed after a pipeline has been completed.

4. A method as claimed in claim 1, wherein the inner portions of the disposable closre means which have performed their closure functions are removed after a section of a pipeline has been completed.

5. A method as claimed in claim 1, wherein the closable passage through each disposable closure means is provided by a tubular extension communicating with an opening in said disposable closure means and said opening is closed by clamping or tying the tubular extension.

6. A method as claimed in claim 1, wherein said disposable closure means is positioned over one of said pipe ends and within the other of said pipe ends at each said joint, each said sealing means being positioned over a respective one of said disposable closure means.

7. A method as claimed in claim 1, wherein the fluid environment is air and the space between successive pipes is evacuated to a pressure below atmospheric pressure.

8. A method as claimed in claim 7, wherein the space between successive pipes is evacuated to a pressure of between 2 to 5 psi below atmospheric pressure.

9. A method of joining a series of pipes together to form a pipeline in a fluid environment, and in which the joints between the pipes incorporate sealing means, said method including the steps of positioning closure means over the ends of first and second pipes remote from the joint to be formed between said pipes, positioning said first and second pipes in axial alignment and with a sealing means therebetween, positioning a first disposable closure means, having a closable passage therethrough, at the joint between said first and second pipes, evacuating the space within said first and second pipes to a pressure below the outside fluid pressure with the greater outside fluid pressure axially forcing the pipes together against the resistance of the sealing means at said joint, removing the closure means from the end of said second pipe remote from said joint, positioning a closure means on the end of a third pipe to be joined to said second pipe, closing the closable passage through said first disposal closure means to form a closure at the joint between said first and second pipes, positioning said third pipe in axial alignment with said second pipe and with a sealing means therebetween, positioning a second disposable closure means at the joint between said second and third pipes, evacuating the space within said second and third pipes to a pressure below the outside fluid pressure with the greater outside fluid pressure axially forcing said third pipe onto the end of said second pipe against the resistance of the sealing means at said joint, repeating the above steps for each successive pipe to be added, and removing an inner portion of each disposable closure means after it has performed its closure function by cutting around the inner periphery of the joint of which it forms part.

10. A system for joining a series of pipes together to form a pipeline in a fluid environment, and in which the joints between the pipes incorporate sealing means, said pipes each having spigot and socket ends adapted to mate with socket and spigot ends, respectively, on adjacent pipes, said system including a first closure means adapted to be positioned over the spigot end of a first pipe and having a closable opening therethrough, said first pipe spigot end being positionable in axial alignment with and adjacent a socket end of a second pipe, sealing means between said aligned spigot and socket ends, a second closure means adapted to sealingly engage and close the socket end of said first pipe, a third closure means adapted to sealingly engage and close the spigot end of said second pipe, means for evacuating the space within said first and second pipes, while said closable opening in said first closure means is open, to a pressure below the fluid pressure outside said pipes, whereby the outside fluid pressure causes said first pipe spigot end to move into sealing engagement with said second pipe socket end, said first closure means opening being thereafter closed, whereby said first closure means closes the spigot end of said first pipe, a fourth closure means having a closable opening therethrough adapted to sealingly engage the spigot end of a third pipe positionable in axial alignment with and adjacent the socket end of said first pipe after said second clsoure means is removed therefrom, sealing means between said aligned spigot and socket ends, said second closure means adapted to sealingly engage and close the socket end of said third pipe, means for evacuating the space within said first and third pipes to a pressure below the fluid pressure outside said first and third pipes, whereby the outside fluid pressure causes the spigot end of said third pipe to move into sealing engagement with the socket end of said first pipe.

11. A system as claimed in claim 10, wherein an inner portion of said first closure means is removed after it has performed its closure function.

12. A system claimed in claim 10, wherein said first closure means comprises a diaphragm adapted, in use, to cover the end of the first pipe and having a peripheral portion adapted to extend along the outside surface of said first pipe adjacent the end thereof, and a clamping ring for clamping the peripheral portion of the diaphragm to said first pipe.

13. A system as claimed in claim 10, wherein said second closure means comprises a diaphragm adapted, in use, to cover the end of said second pipe and any successive pipe, and having a peripheral portion adapted to extend along the outside surface of the second pipe and each successive pipe, adjacent the end thereof, and a clamping ring for clamping the peripheral portion of the diaphragm to said second pipe, and each successive pipe, and wherein the inner portion of said diaphragm has a tubular extension formed integrally therewith, communicating with an opening through said diaphragm, and adapted for attachment to said pump means.

14. A system as claimed in claim 10, wherein each said disposable closure means comprises a diaphragm having a peripheral portion adapted to be jammed between the sealing means and the end of one of the pipes at each joint, and an inner portion including a tubular extension formed integrally therewith and communicating with an opening through said diaphragm.

15. A system as claimed in claim 10, wherein said first closure means, said second closure means, and the disposable closure means comprise diaphragms formed from flexible sheet material.

* * * * *